US008037533B2

(12) United States Patent
Tsai et al.

(10) Patent No.: US 8,037,533 B2
(45) Date of Patent: Oct. 11, 2011

(54) DETECTING METHOD FOR NETWORK INTRUSION

(75) Inventors: Cheng-Fa Tsai, Pingtung (TW); Chia-Chen Yen, Taipei (TW)

(73) Assignee: National Pingtung University of Science and Technology, Pingtung County (TW)

( * ) Notice: Subject to any disclaimer, the term of this patent is extended or adjusted under 35 U.S.C. 154(b) by 926 days.

(21) Appl. No.: 12/021,342

(22) Filed: Jan. 29, 2008

(65) Prior Publication Data

US 2008/0306715 A1    Dec. 11, 2008

(30) Foreign Application Priority Data

Jun. 11, 2007   (TW) ................................ 96120965 A

(51) Int. Cl.
*G06F 11/00*   (2006.01)
*G06F 17/00*   (2006.01)
(52) U.S. Cl. ............ 726/23; 726/22; 709/224; 708/204; 708/205; 708/530; 706/46; 706/47
(58) Field of Classification Search .................... 726/22, 726/23; 709/224; 708/204, 205, 530; 706/46, 706/47
See application file for complete search history.

(56) References Cited

U.S. PATENT DOCUMENTS

| 5,864,679 | A | * | 1/1999 | Kanai et al. ................... 709/238 |
| 6,134,664 | A | * | 10/2000 | Walker ............................ 726/22 |
| 6,769,006 | B2 | | 7/2004 | Krouglov et al. |
| 7,080,250 | B2 | | 7/2006 | Calvert |

(Continued)

FOREIGN PATENT DOCUMENTS

| TW | I268685 | 10/1993 |
| WO | WO 02/27443 A2 * | 4/2002 |

OTHER PUBLICATIONS

Gao et al., "A Framework for an Adaptive Anomaly Detection System with Fuzzy Data Mining". 2006, Wuhan University Journal of Natural Sciences, vol. 11, No. 6, pp. 1797-1800.*

(Continued)

*Primary Examiner* — Nathan Flynn
*Assistant Examiner* — Sarah Su
(74) *Attorney, Agent, or Firm* — Alan Kamrath; Kamrath & Associates PA

(57) ABSTRACT

A detecting method for network intrusion includes: selecting a plurality of features contained within plural statistical data by a data-transforming module; normalizing a plurality of feature values of the selected features into the same scale to obtain a plurality of normalized feature data; creating at least one feature model by a data clustering technique incorporated with density-based and grid-based algorithms through a model-creating module; evaluating the at least one feature model through a model-identifying module to select a detecting model; and detecting whether a new packet datum belongs to an intrusion instance or not by a detecting module.

10 Claims, 6 Drawing Sheets

U.S. PATENT DOCUMENTS

| | | | |
|---|---|---|---|
| 7,089,592 | B2 | 8/2006 | Adjaoute |
| 7,174,344 | B2 * | 2/2007 | Campos et al. ........................ 1/1 |
| 7,567,922 | B1 * | 7/2009 | Weinberg et al. ............. 705/26.5 |
| 7,724,963 | B2 * | 5/2010 | Kravec et al. .................. 382/225 |
| 7,747,624 | B2 * | 6/2010 | Campos et al. ............... 707/737 |
| 7,788,722 | B1 * | 8/2010 | Njemanze et al. .............. 726/23 |
| 7,853,542 | B2 * | 12/2010 | Tsai et al. ........................ 706/45 |
| 2005/0038839 | A1 * | 2/2005 | Ghosh et al. ................... 708/205 |
| 2009/0094175 | A1 * | 4/2009 | Provos et al. .................... 706/12 |
| 2009/0292802 | A1 * | 11/2009 | Popescu et al. ............... 709/223 |
| 2010/0071061 | A1 * | 3/2010 | Crovella et al. ................. 726/23 |
| 2010/0082513 | A1 * | 4/2010 | Liu .................................. 706/46 |
| 2011/0040758 | A1 * | 2/2011 | Tsai et al. ..................... 707/737 |

OTHER PUBLICATIONS

Kumar et al., "The use of artificial intelligence based techniques for intrusion detection: a review". Sep. 2010, The Artificial Intelligence Review, vol. 34, Iss. 4, pp. 369-387.*

Mukkamala et al., "Identifying Significant Features for Network Forensic Analysis Using Artificial Intelligent Techniques". 2003, International Journal of Digital Evidence, vol. 1, Issue 4.*

Yang et al. "Learning Vector Quantization Neural Network Method for Network Intrusion Detection." Wuhan University Journal of Natural Sciences. vol. 12, No. 1, 2007, pp. 147-150.*

* cited by examiner

DETECTING METHOD FOR NETWORK INTRUSION

BACKGROUND OF THE INVENTION

1. Field of the Invention

The present invention relates to a detecting method for network intrusion and, particularly, to a detecting method creating a detecting model by a data clustering technique incorporated with density-based and grid-based algorithms to detect intrusion linking toward a network.

2. Description of the Related Art

Generally, conventional detecting methods for network intrusion can be categorized into "misuse detection" and "anomaly detection".

An "intrusion mode database" is pre-established with various patterns of well-known intrusions, and, then, a detected intrusion instance is compared with the various patterns within the intrusion mode database. The comparison between the detected intrusion instance and the various patterns is focused on features such as a way to link to the network, and the detected intrusion instance is thereby identified as an intrusion if a pattern similar to the detected intrusion instance is found. However, the intrusion mode database must be renewed with latest patterns of well-known intrusions regularly, which causes difficulty in management of the database. Also, due to a large amount of the patterns within the intrusion mode database, the efficiency of detecting is bad. Furthermore, the misuse detection is unable to detect any unknown intrusion until a corresponding pattern is entered into the intrusion mode database, which defect induces a low accuracy of detection of intrusions.

In contrast to the misuse detection, anomaly detection determines whether a network intrusion has occurred or not by recognizing an intrusion instance. In order to complete the determination by identifying the differences between the intrusion instance and a formal pattern, a "normal instance model" is created and is trained by a plurality of labeled data, to recognize the intrusion instance through the normal instance model. Consequently, an intrusion instance, which differs from formal patterns that are able to pass the test held by said normal instance model, is distinguished. Advantages of the anomaly detection lay in that the intrusion mode database used in misuse detection is absent from the anomaly detection, such that the anomaly detection can detect unknown intrusions.

However, once a datum of an intrusion instance is included in the labeled data, said anomaly detection would therefore not be able to detect intrusions accurately and effectively. Moreover, although the anomaly detection is widely applied recently, it is still not ideal for use, because it is hard to acquire labeled data that totally excludes data of intrusions owing to its time-consuming extraction.

Furthermore, a detecting method for network intrusion is presented in Taiwan Patent No. 1268685 titled "method and system with data clustering technique for network intruding detection". According to the detecting method, a packet statistical data is provided initially, and a plurality of features of the packet statistical data is then identified. With those features, a data clustering process is applied to create a plurality of feature models, and correctness of each feature model is finally identified, to select one of the feature models as a detecting model for judging whether a new packet datum belongs to an intrusion or not. Accordingly, the correctness of the detecting model and the accuracy of the network intruding detection are based on the reliability of the data clustering process. Therefore, the correctness and accuracy thereof can be largely raised through a data clustering method with high efficiency and accuracy. Hence, there is a need of improving the conventional clustering techniques.

SUMMARY OF THE INVENTION

The primary objective of this invention is to provide a detecting method for network intrusion, which normalizes a plurality of feature values contained within plural statistical data; creates a feature space having a plurality of cubes; disposes the statistical data into the feature space according to the normalized feature values; and, then, identifies a data density of each cube. Thereby, a plurality of populated cubes is defined, and a detecting model is created to distinguish normal instances from intrusion instances that may be intrusions. Consequently, the efficiency of data clustering and the accuracy of intruding detection are increased.

The secondary objective of this invention is to identify whether the data within the populated cubes are populated enough or not through a "Dynamic-Gradient-Threshold" value. The populated cubes are categorized into major cubes or minor cubes thereby, and the data within said cubes are incorporated into a clustering result. Consequently, the executing time cost is reduced while the accuracy of intruding detection increases.

The detecting method for network intrusion in accordance with an aspect of the present invention includes the steps of: selecting a plurality of features contained within plural statistical data by a data-transforming module; normalizing a plurality of feature values of the selected features into the same scale to obtain a plurality of normalized feature data; creating at least one feature model by a data clustering technique incorporated with density-based and grid-based algorithms through a model-creating module; evaluating the at least one feature model through a model-identifying module to select a detecting model; and detecting whether a new packet datum belongs to an intrusion instance or not by a detecting module.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
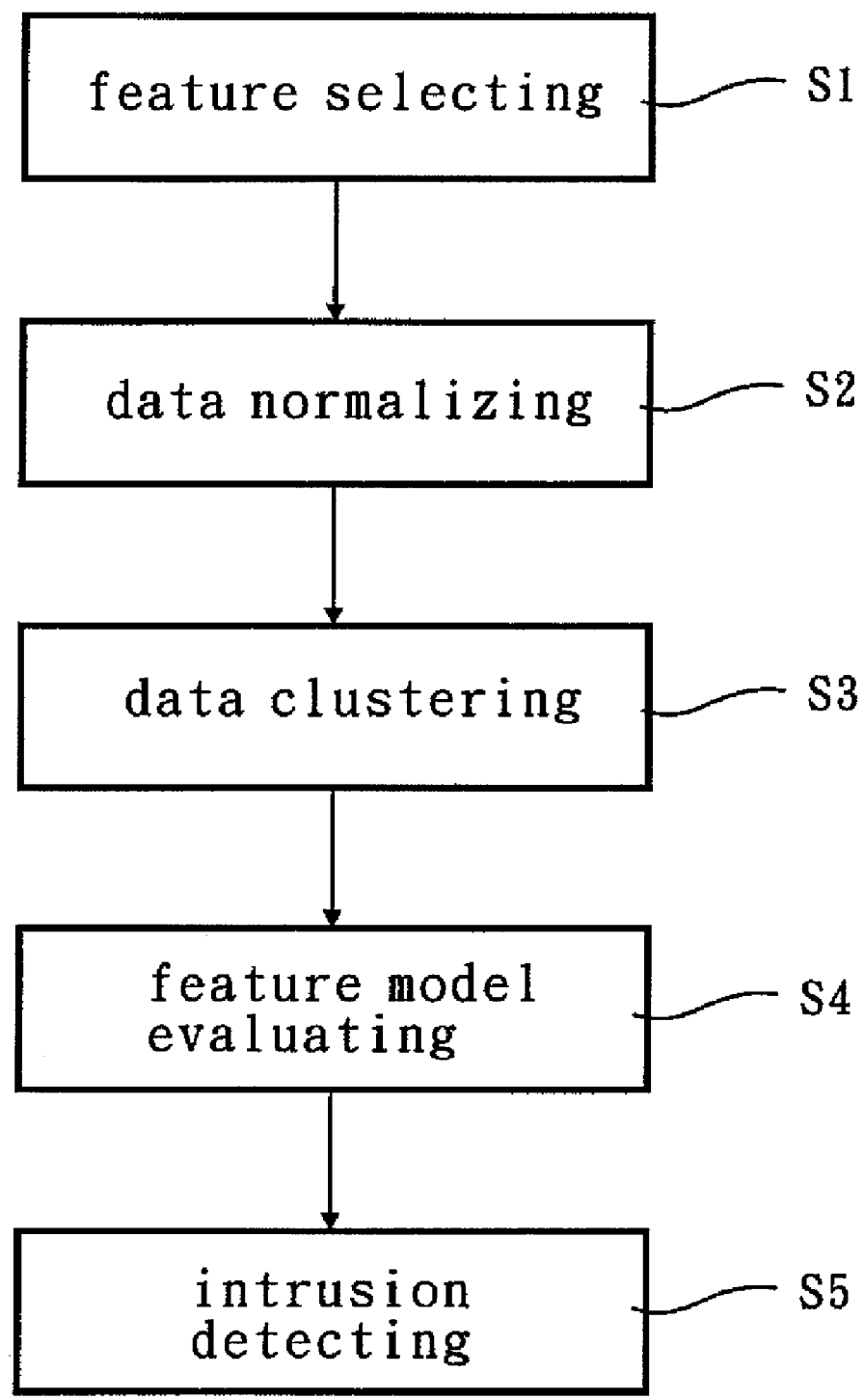
FIG. 1 is a flow chart illustrating a detecting method for network intrusion in accordance with a preferred embodiment of the present invention.
Figure 2:
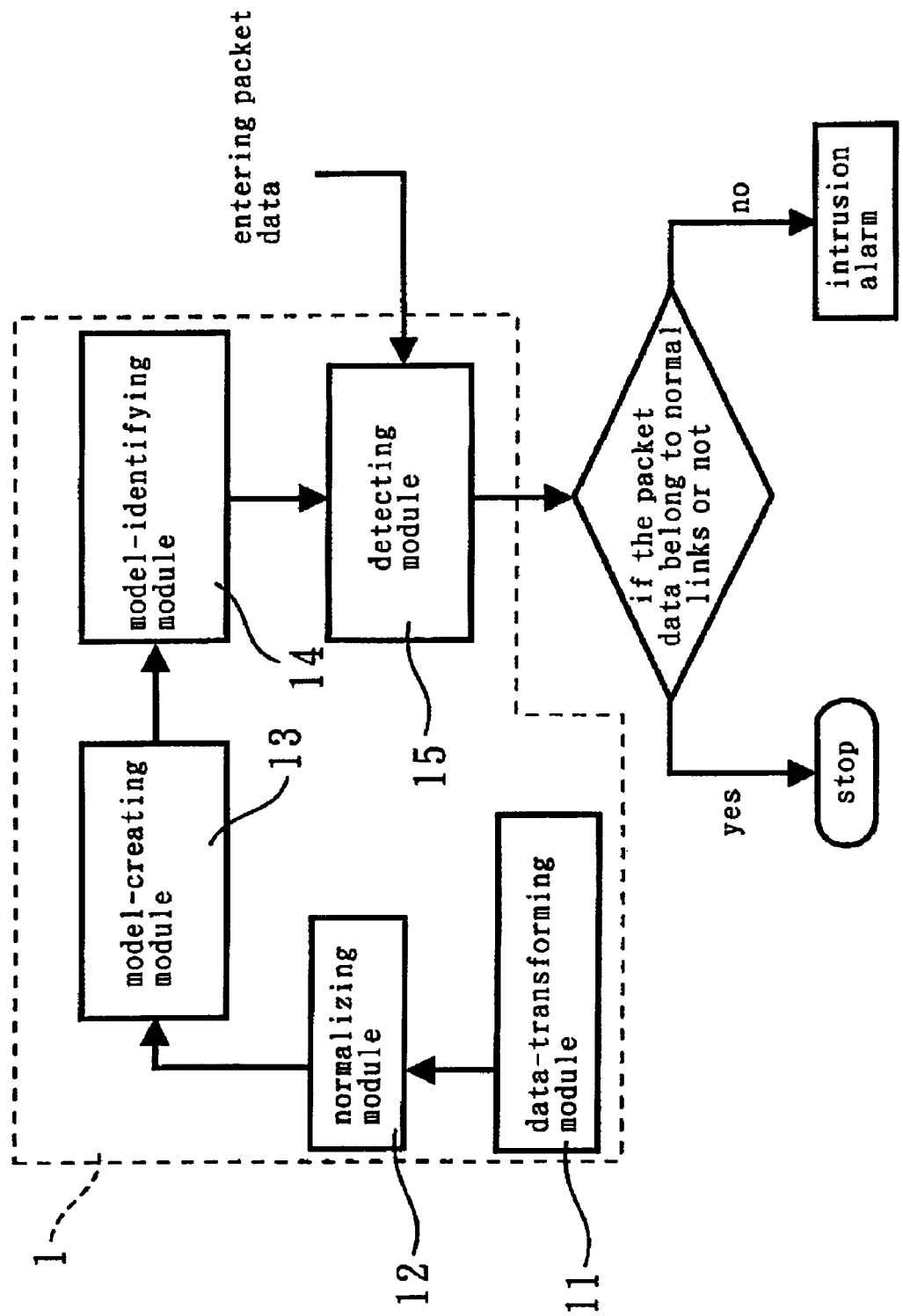
FIG. 2 is a block diagram illustrating a system for a detecting method for network intrusion in accordance with the preferred embodiment of the present invention.

Referring to FIGS. 1 and 2 in accordance with a preferred embodiment of the present invention, a computer 1 comprising a data-transforming module 11, a normalizing module 12, a model-creating module 13, a model-identifying module 14 and a detecting module 15 is provided initially. Furthermore, processes of the proposed detecting method for network intrusion include "feature selecting", "data normalizing", "data clustering", "feature model evaluating" and "intrusion detecting", which are designated as S1 to S5 in sequence and processed by the computer 1, so as to perform the intruding detection effectively and accurately.

In process S1, the "feature selecting" process, a plurality of "packet data" is quantified into a plurality of "statistical data" by the data-transforming module 11, and a plurality of features contained within each of the statistical data is selected. In detail, the packet data may be protocol type or IP addresses, and the corresponding statistical data may be numbers presenting the protocol type or a total of instances entering the same host system in a given interval of time. Regarding to the features, they are defined according to a conclusion of a paper entitled as "Identifying Significant Features for Network Forensic Analysis Using Artificial Intelligent Techniques", proposed by Srinivas et al. and presented on "International Journal of Digital Evidence" in 2003. In said paper, few significant features for distinguishing "normal instances" from "intrusion instances" are identified by an artificial intelligence technique, and thus the dimensions and complexity of the packet data are limited through those significant features. Consequently, from the significant features identified by Srinivas, said selected features are chosen, which are shown in the following table for example.

| No. | item | interpretation |
|-----|------|----------------|
| 1 | Duration | Length of an instance made by a destination system to a host system |
| 3 | Service | Network service such as HTTP, FTP etc. used by a destination system to link to a host system |
| 5 | Source bytes | Number of bytes sent from a host system to a destination system |
| 6 | Destination bytes | Number of bytes sent from a destination system to a host system |
| 10 | Hot indicators | Number of "hot" indicators |
| 17 | File creations | Number of file operations |
| 23 | Count | Number of instances made to the same host system in a given interval of time |
| 27 | REG error rate | Percentage of instances that have REG error |
| 28 | Same service-REG error rate | Percentage of instances with the same service that have REG errors |
| 29 | Same service rate | Percentage of instances from a destination system to a host system with the same service in a given interval of time |
| 33 | Destination-Host-Service-Count | Number of instances made by a destination system using the same service to the same host system in a given interval of time |
| 36 | Destination-Host-Same source-port rate | Percentage of instances from a destination system to the same port of the host system in a given interval of time |
| 39 | Destination-Host-Service source-SYN error rate | Percentage of instances from a destination system to the host system with SYN errors in a given interval of time |

In process S2, the "data normalizing" process, the normalizing module 12 normalizes a plurality of feature values of the selected features contained within the statistical data into the same scale, so as to reduce errors caused by a difference between various degrees of quantification over the packet data. Preferably, formulas for normalization are defined as:

$$AvgVector[j] = \frac{1}{N}\sum_{i=1}^{N} Inst_i[j];$$

$$StdVector[j] = \sqrt{\frac{1}{N-1}\sum_{i=1}^{N}(Inst_i[j] - AvgVector[j])^2} \text{ ; and}$$

$$NewInst_i[j] = \frac{inst_i[j] - AvgVector[j]}{StdVector[j]}.$$

The "AvgVector[j]" denotes an average of the feature values of one of the selected features, namely, a feature "j" contained within all the statistical data; the "N" denotes the amount of the statistical data; the "$Inst_i[j]$" denotes the i-th feature value of the feature "j"; the "StdVector[j]" denotes a standard deviation of the feature values of the feature "j" contained within all the statistical data; and the "$NewInst_i[j]$" denotes the normalized feature values. As a result, a plurality of normalized feature data 2 that contains the normalized feature values is obtained through the above "data normalizing" process.

In the "data clustering" process designated as process S3, at least one feature model is created through the model-creating module 13 by clustering the normalized feature data 2. Moreover, referring to FIG. 3, steps for data clustering comprise "data disposing", "identifying major cubes", "identifying edge data", and "data combining" designated as S31 through S34 in sequence.

Figure 4:
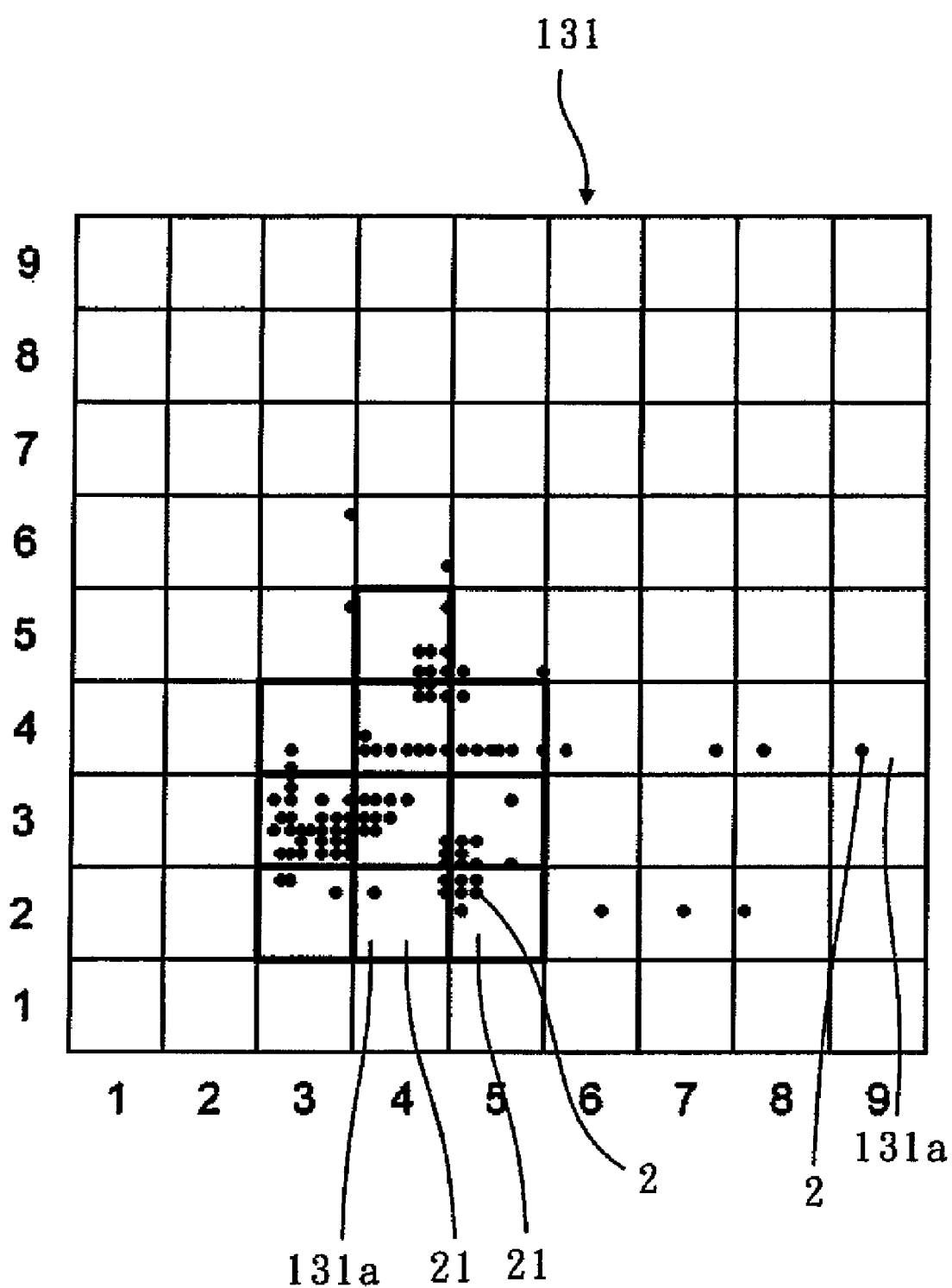
FIG. 4 is a schematic view of a result in accordance with the preferred embodiment of the present invention after a "data disposing" step is just performed.

Referring now to FIGS. 2 and 4, in step S31, the "data disposing" step, a feature space 131 is created by the model-creating module 13. The feature space 131 is then divided into a plurality of cubes 131a after a cube size is inputted into the model-creating module 13, with said cubes 131a being line segments in one-dimension, grids in two-dimension or small spaces in "n"-dimension, with "n" being larger than two. Furthermore, the dimension of the cubes 131a depends on the number of the selected features. After that, the model-creating module 13 retrieves the normalized feature data 2 and disposes them into corresponding cubes 131a according to the normalized feature values thereof. Through the model-creating module 13, a predetermined value is designated as a threshold value of density and is preferably an integer. Thereby, the model-creating module 13 distinguishes the cubes 131a having data densities higher than the threshold value from those having data densities lower than the threshold value, with the data density of each cube 131a equaling the amount of the normalized feature data 2 disposed therein. The cubes 131a with their data densities being higher than the threshold value are defined as populated cubes 21, which are shown as those cubes with thick sidelines in FIG. 4. In contrast, the normalized feature data 2 in the cubes 131a with their data densities being lower than the threshold value, which are shown with thin sidelines in FIG. 4, are excluded.

In order to identify one of the populated cubes 21 as a "tiptop" to be a start point for searching in coming procedures, a "dense-value" for representing an amount of the normalized feature data 2 within each of the populated cubes 21 is identified. According to the identified dense-values, the normalized feature data 2 within one of the populated cubes 21 can be regarded as being included in the same cluster if the dense-value is high. However, if the dense-value of a populated cube 21 is low, there is a relatively remote possibility that the normalized feature data 2 within the populated cubes 21 is included in the same cluster; that is, the normalized feature data 2 therein may be included in a plurality of clusters. Consequently, one of the populated cubes 21 can be identified as the tiptop while the dense-value of said populated cube 21 is the highest among those of all the populated cubes 21. All of the instances represented by the normalized feature data 2 within the populated cubes 21 identified as the tiptop are regarded as normal instances.

Figure 3:
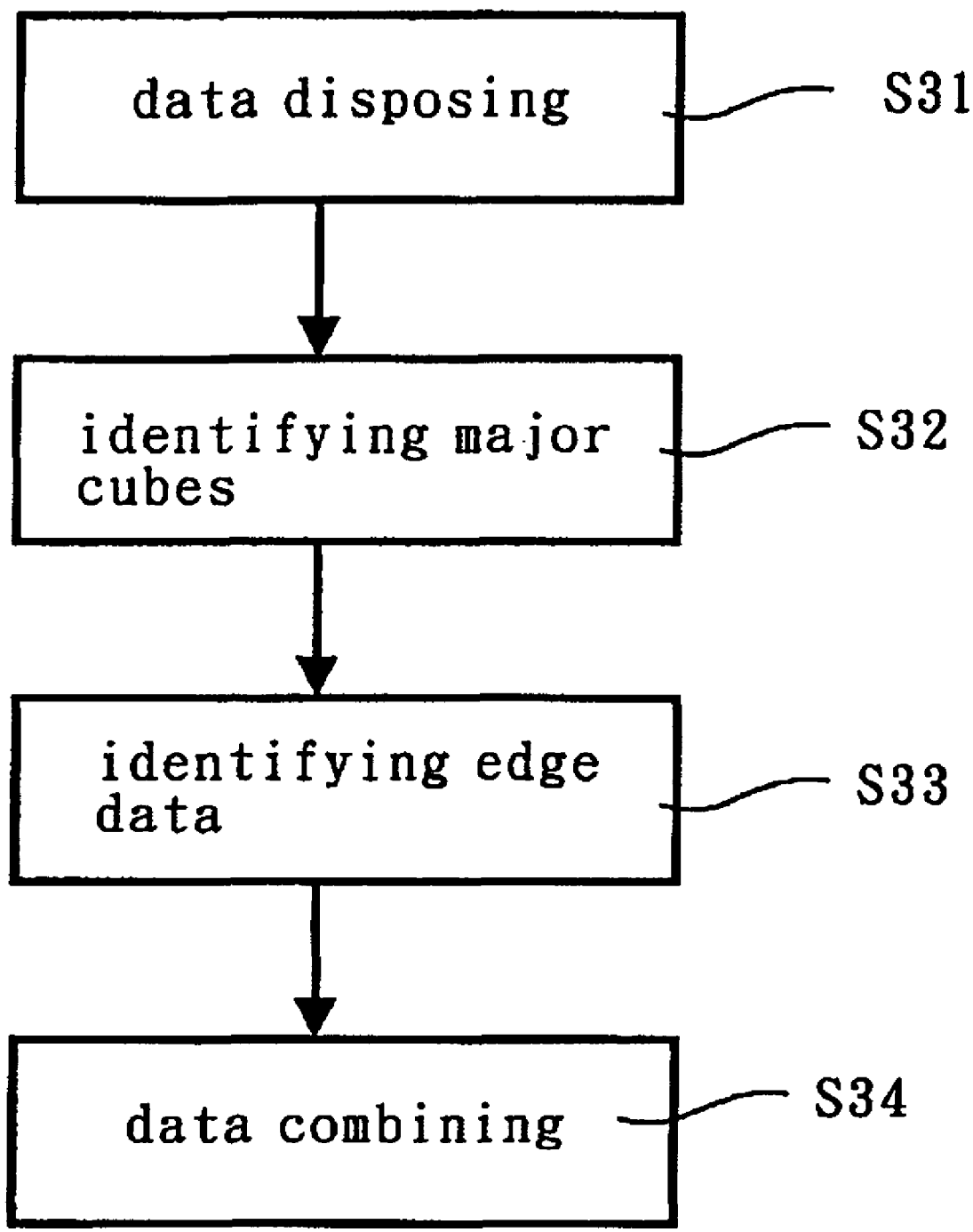
FIG. 3 is a flow chart illustrating steps in a "data clustering" process of the detecting method for network intrusion in accordance with the preferred embodiment of the present invention.
Figure 6:
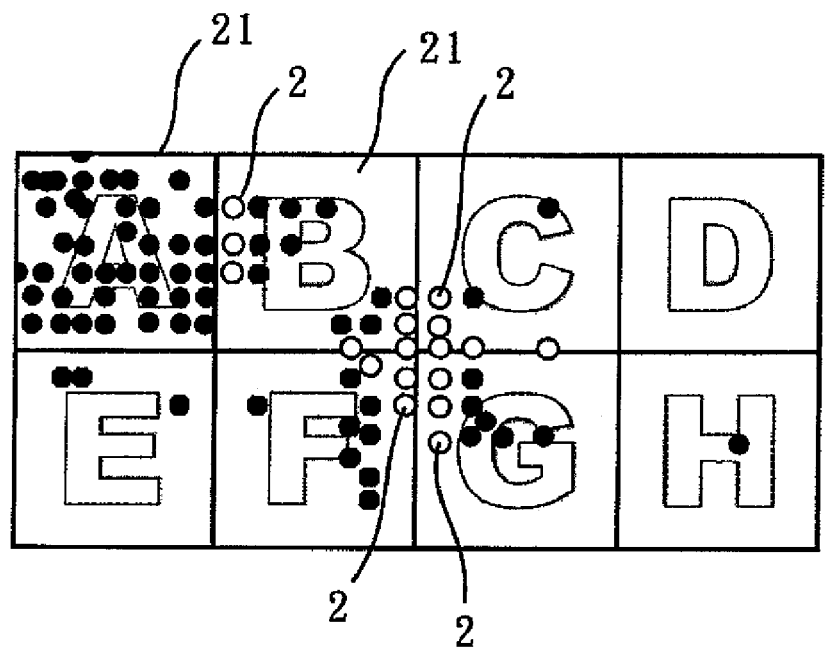
FIG. 6 is a schematic view of a result in accordance with the preferred embodiment of the present invention after a "identifying edge data" step is just performed.

Referring now to FIGS. 3 and 6, in step S32, the "identifying major cubes" step, the model-creating module 13 further defines a "Dynamic-Gradient-Threshold" (DGT) value, so as to categorize the populated cubes 21 into "major cubes" and "minor cubes". The amount of the normalized feature data 2 within each major cube is larger than the DGT value, and that of the normalized feature data 2 within each minor cube is smaller than the DGT value. A DGT function used to obtain the DGT value is defined as the following:

$$DGT = |c_i| * PSV,$$

wherein the "$|c_i|$" denotes the amount of the normalized feature data 2 within an extremely populated cube "$c_i$" that is one of the populated cubes 21 which jointly contain a cluster and has the highest dense-value among those of said populated cubes 21 containing the same cluster; and the "PSV" denotes a predetermined percentage setting a relationship between the DGT value and the amount of the normalized feature data 2 in the extremely populated cube "$c_i$". Accordingly, at least one extremely populated cube "$c_i$" exists in the feature space 131, with the tiptop being one of the at least one extremely populated cube "$c_i$", and the DGT value varies with the amount of the normalized feature data 2 within the extremely populated cube "$c_i$".

Generally, according to assumptions proposed by Denning in 1987 and Javitz in 1993, an amount of the normal instances must be greater than that of the intrusion instances. In detail, the assumptions are that: most of the instances are normal, and the feature values of the intrusion instances are different from those of the normal ones. For clearly illustrating a result of above assumption and showing the relationship between the amount of the normalized feature data 2 in each of the populated cubes 21 and the clusters contained in the populated cubes 21, another embodiment simpler than the preferred one and FIG. 5, a column diagram thereof, are presented. In this embodiment, only a feature is selected, and therefore, the cubes 131a of the feature space 131 are line segments. With the normalized feature data 2 being disposed into the feature space 131, the column diagram is then built, with each column therein representing the amount of the normalized feature data 2 in each cube 131a. The cubes 131a with the amounts of the normalized feature data 2 contained therein being larger than the threshold value are then defined as the populated cubes 21, which jointly contain at least one cluster, for example, three clusters designated as NC1, NC2, and NC3 and shown in FIG. 5. Therefore, according to the mentioned assumptions, instances with their normalized feature data 2 disposed within the clusters are regarded as the normal instances; and instances with those disposed out of the clusters are regarded as the intrusion instances, which may also be regarded as outlier data or noise data.

Figure 5:
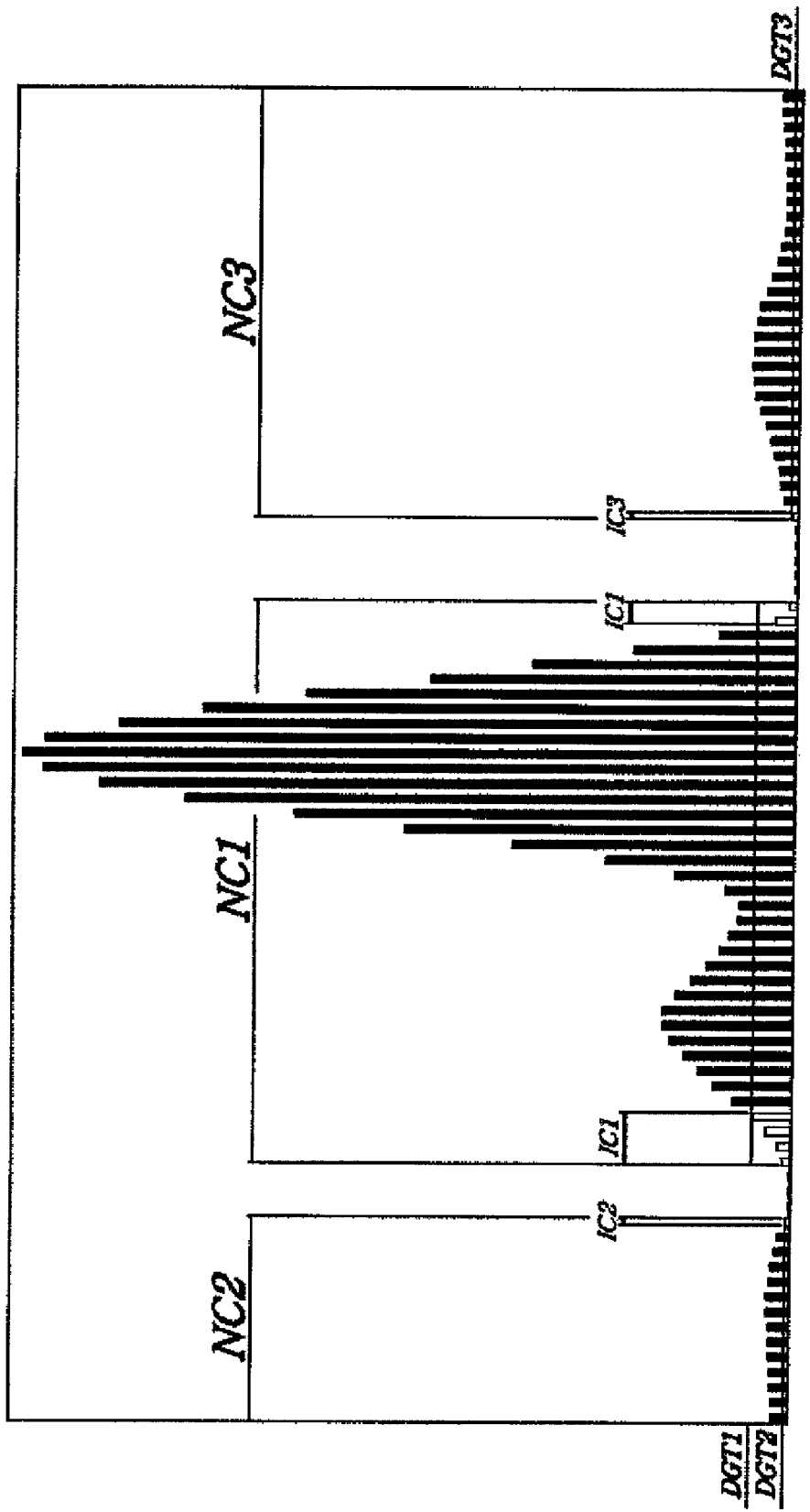
FIG. 5 is a column diagram showing amounts of data within a plurality of cubes and a plurality of DGT values of the detecting method for network intrusion in accordance with another embodiment of the present invention.

Referring to FIG. 5 again, a DGT value for every cluster is identified according to the DGT function, such as the three DGT values designated as DGT1, DGT2, and DGT3 in FIG. 5. Thereby, when the DGT values are obtained and for each cluster, the populated cubes 21 which jointly contain the same cluster and have amounts of the normalized feature data 2 disposed therein higher than the corresponding DGT value are categorized as major cubes. On the contrary, the populated cubes 21 having amounts of the normalized feature data 2 disposed therein lower than the corresponding DGT value are categorized as minor cubes. In FIG. 5, the columns represented by thick lines are major cubes, and those represented by hollow lines are minor cubes.

Referring now to FIGS. 3, 5 and 6, in step S33, the "identifying edge data" step, the model creating module 13 detects the minor cubes such as the populated cubes 21 in regions IC1, IC2, end IC3 in FIG. 5 or those designated as "B", "C", "F" and "G" in FIG. 6 in detail by a density-based algorithm, for example, a DBSCAN algorithm. Within each of the minor cubes designated as "B", "C", "F" and "G" in FIG. 6, at least one sub-cluster is searched, with said sub-cluster including a plurality of "border data" that is disposed near borders of each minor cube. After that, the normalized feature data 2 in the at least one sub-cluster are then compared with those in the major cubes such as that designated as "A" in FIG. 6. The normalized feature data 2 in the at least one sub-cluster are identified as edge data of a cluster and combined with those in the major cubes, which are identified as main structure data of a cluster, if they are adjacent to each other in the feature space 131.

Referring to FIGS. 1 through 3, in the last step S34, the "data combining" step, all the normalized feature data 2 combined with each other are designated in the same cluster. Besides, steps S31 through S34 are recursively processed, so as to complete the work for data clustering over all the normalized feature data 2. As a result, at least one feature model is created by the "data clustering" process S3 to distinguish normal instances from intrusion instances.

In the "feature model evaluating" process designated as process S4, said at least one feature model is inputted into the model-identifying module 14, so as to identify correctness thereof and to select one of the at least one feature model as a detecting model for the detecting module 15 to detect whether a new packet datum belongs to an intrusion instance or not. Preferably, the correctness of the at least one feature model is identified by two values that are conventionally used in relative arts: "Detection Rate" (DR) and "False Positive Rate" (FPR). Said DR is given by a number of instances, which is identified as intrusion instances by a detecting method, divided by a total number of intrusion instances in the packet data. The FPR is defined as a number of instances, which is incorrectly identified as intrusion instances by the detecting method, divided by a total number of normal instances. Accordingly, for an excellent feature model, the value of DR is expected to be high, and that of FPR should be low.

Figure 7:
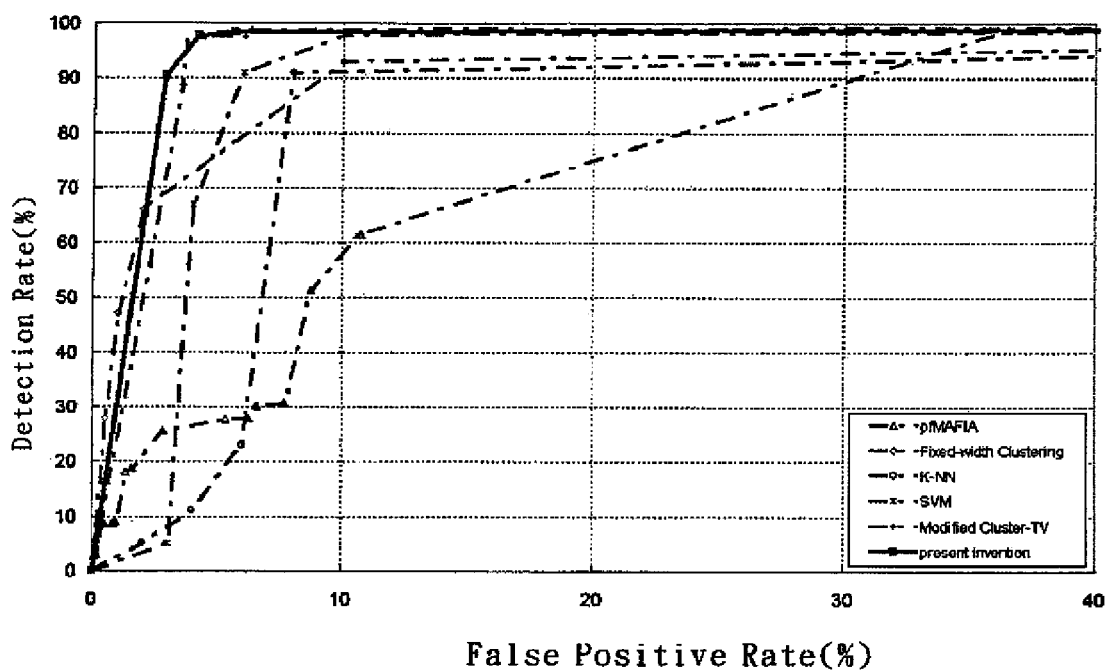
FIG. 7 is a curve diagram illustrating Detection Rate (DR) and False Positive Rate (FPR) in accordance with conventional detecting methods and the preferred embodiment of the present invention.

After calculating for the values of DR and FPR, a "Receiver Operating Characteristic" (ROC) curve illustrating a relationship between said DR and FPR is obtained, which is shown by FIG. 7. Thereby, an "Area Under the Curve" (AUC) value is acquired, the larger the AUC value is, the higher the value of DR is, and the lower that of FPR is. As a result, the detecting model with a largest AUC value among those of all the feature models can be identified.

In the "intrusion detecting" process designated as process S5, by being inputted into the detecting module 15, at least one packet datum is judged to see whether or not features of the at least one packet datum match those of the normal instances defined by the detecting model. Thus, the detection of network intrusion is completed.

Referring to FIG. 7 again, a plurality of conventional algorithms is processed, so as to compare the efficiency of the present invention with the conventional algorithms. Said conventional algorithms include phMAFIA algorithm, fixed-width clustering IDS algorithm, K-NN IDS algorithm SVM IDS algorithm and modified clustering-TV IDS algorithm, and the packet data are KDD CUP99. Moreover, in order to execute the tests, the computer 1 comprises a CPU of Intel Pentium 4 with a frequency of 1.5 GHz, a random-access memory (RAM) with 256 Mbytes, and a Java computer program. The following table shows a result of the comparison between the present invention and the conventional algorithms.

| Detecting method | AUC value |
| --- | --- |
| pfMAFIA | 0.867 |
| fixed-width clustering IDS | 0.940 |
| K-NN IDS | 0.895 |
| SVM IDS | 0.949 |
| modified clustering-TV IDS | 0.973 |
| present invention | 0.976 |

From the AUC values in the above table, the present invention is better than the five conventional algorithms. Besides, in comparison with said conventional algorithms, the present invention provides a detecting method having no disadvantages, such as low detecting efficiency and great clustering difficulty, that exist in the conventional algorithms.

The present invention selects the features contained within each of the statistical data initially; normalizes the feature values thereof into the same scale; retrieves the normalized feature data 2 and disposes them into corresponding cubes 131a; identifies the disposition of the normalized feature data 2 within the cubes 131a through the threshold value of density and DGT values; combines the normalized feature data 2 within the major cubes and minor cubes being adjacent to each other to create the at least one feature model; and identifies correctness thereof and selects one of the at least one feature model as a detecting model for the detecting module 15 to detect whether a new packet datum belongs to an intrusion instance or not. Thereby, the present invention can effectively raise the correctness of the detecting model and the accuracy of the network intruding detection.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A detecting method for network intrusion comprising:
providing a computer including a data-transforming module, a normalizing module, a model-creating module, and a model-identifying module;
selecting a plurality of features contained within plural statistical data by the data-transforming module;
normalizing a plurality of feature values of the selected features into an identical scale by the normalizing module to obtain a plurality of normalized feature data;
creating a feature space having a plurality of cubes by the model-creating module, disposing the normalized feature data into the plurality of cubes according to normalized feature values, and defining plural populated cubes having data densities higher than a threshold value of density;
categorizing the populated cubes into major cubes and minor cubes with each major cube having an amount of the normalized feature data larger than a Dynamic-Gradient-Threshold (DGT) value and each minor cube having an amount of the normalized feature data smaller than the DGT value;
detecting the minor cubes in detail by a density-based algorithm to create at least one sub-cluster within each minor cube for combining the normalized feature data within the at least one sub-cluster with those in the adjacent major cubes, so as to create at least one feature model; and
inputting the at least one feature model into the model-identifying module to select one of the at least one feature model as a detecting model for detecting whether a new packet datum belongs to an intrusion instance or not by a detecting module.

2. The detecting method for network intrusion as defined in claim 1, wherein normalizing the plurality of features comprises normalizing the plurality of features according to formulas for normalization defined as:

$$AvgVector[j] = \frac{1}{N}\sum_{i=1}^{N} Inst_i[j],$$

$$StdVector[j] = \sqrt{\frac{1}{N-1}\sum_{i=1}^{N}(Inst_i[j] - AvgVector[j])^2}, \text{ and}$$

$$NewInst_i[j] = \frac{inst_i[j] - AvgVector[j]}{StdVector[j]},$$

wherein the "AvgVector[j]" denotes an average of the feature values of one feature "j" of the selected features; the "N" denotes an amount of the statistical data; the "$Inst_i[j]$" denotes the i-th feature value of the feature "j"; the "StdVector[j]" denotes a standard deviation of the feature values of the feature "j" contained within the plural statistical data; and the "$NewInst_i[j]$" denotes the normalized feature values.

3. The detecting method for network intrusion as defined in claim 1, wherein the threshold value of density is an integer, and the normalized feature data in the cubes with their data densities being lower than the threshold value of density are excluded.

4. The detecting method for network intrusion as defined in claim 1, wherein a dense-value for representing an amount of the normalized feature data within each populated cube is identified, and one of the populated cubes is identified as a tiptop to be a start point for searching the feature space.

5. The detecting method for network intrusion as defined in claim 1, wherein a DGT function used to obtain the DGT value is defined as the following:

$$DGT = |c_i| * PSV,$$

wherein the "$|c_i|$" denotes the amount of the normalized feature data within an extremely populated cube "$|c_i|$" that is one of the populated cubes which jointly contain a cluster and has the highest dense-value among those of said populated cubes containing the same cluster; and the "PSV" denotes a predetermined percentage.

6. The detecting method for network intrusion as defined in claim 1, wherein the minor cubes are detected by a DBSCAN algorithm.

7. The detecting method for network intrusion as defined in claim 1, wherein a plurality of border data disposed near borders of each minor cube is identified to create the at least one sub-cluster.

8. The detecting method for network intrusion as defined in claim 1, wherein the detecting model is selected according to correctness of the at least one feature model, with said correctness being identified by a detection rate given by a number of instances, which are identified as intrusion instances, divided by a total number of intrusion instances in a plurality of packet data, with the statistical data being obtained by quantifying said packet data.

9. The detecting method for network intrusion as defined in claim 1, wherein the detecting model is selected according to correctness of the at least one feature model, with said correctness being identified by false positive rate defined as a number of instances, which are incorrectly identified as intrusion instances, divided by a total number of normal instances.

10. The detecting method for network intrusion as defined in claim 1, wherein the detecting model is selected according to correctness of the at least one feature model, with said correctness being identified by both detection rate and false positive rate;
    wherein the detection rate is given by a number of instances, which are identified as intrusion instances, divided by a total number of intrusion instances in a plurality of packet data, with the statistical data being obtained by quantifying said packet data
    wherein the false positive rate is defined as a number of instances, which are incorrectly identified as intrusion instances, divided by a total number of normal instances;
    wherein a "Receiver Operating Characteristic" curve illustrating a relationship between said detection rate and false positive rate is obtained, and an "Area Under the Curve" value is acquired to identify the correctness of the at least one feature model.

* * * * *